US011985299B2

(12) United States Patent
Kanai (10) Patent No.: US 11,985,299 B2
(45) Date of Patent: May 14, 2024

(54) CALIBRATION DEVICE, CALIBRATION METHOD, CALIBRATION PROGRAM, SPECTROSCOPIC CAMERA, AND INFORMATION PROCESSING DEVICE

(71) Applicant: SEIKO EPSON CORPORATION, Tokyo (JP)

(72) Inventor: Masashi Kanai, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 396 days.

(21) Appl. No.: 17/355,340

(22) Filed: Jun. 23, 2021

(65) Prior Publication Data

US 2021/0409679 A1 Dec. 30, 2021

(30) Foreign Application Priority Data

Jun. 24, 2020 (JP) .................. 2020-108967

(51) Int. Cl.
*H04N 17/00* (2006.01)
*G01J 3/02* (2006.01)
(Continued)

(52) U.S. Cl.
CPC .......... *H04N 17/002* (2013.01); *G01J 3/0297* (2013.01); *G01J 3/462* (2013.01); *G01J 2003/2866* (2013.01)

(58) Field of Classification Search
CPC .. G01N 21/274; H04N 13/246; H04N 17/002; G01J 3/0297; G01J 3/462
(Continued)

(56) References Cited

U.S. PATENT DOCUMENTS

2015/0326771 A1 11/2015 Maruyama et al.
2017/0122807 A1 5/2017 Kasahara et al.
(Continued)

FOREIGN PATENT DOCUMENTS

JP 2010-078418 A 4/2010
JP 2015-178995 A 10/2015
(Continued)

OTHER PUBLICATIONS

Imura Kenji, JP 2005043153A, "Calibration System for Spectral Luminance Meter", Date Published: Feb. 17, 2005 (Year: 2005).*
(Continued)

*Primary Examiner* — John H Le
(74) *Attorney, Agent, or Firm* — Oliff PLC (57) ABSTRACT

A calibration device includes one or more processors. The one or more processors acquire a measured value obtained when a spectroscopic light source configured to output uniform light with a predetermined spectroscopic wavelength and configured to change the spectroscopic wavelength outputs the uniform light while changing the spectroscopic wavelength of the uniform light and a spectroscopic measurement unit to be calibrated spectroscopically measures the outputted uniform light. The one or more processors acquire a target value for each of the spectroscopic wavelengths obtained when the spectroscopic measurement unit measures the uniform light. The one or more processors calculate a transformation matrix for transforming the measured value, based on the measured value and the target value.

8 Claims, 3 Drawing Sheets

(51) Int. Cl.
*G01J 3/28* (2006.01)
*G01J 3/46* (2006.01)

(58) Field of Classification Search
USPC .......................................................... 702/85
See application file for complete search history.

(56) References Cited

U.S. PATENT DOCUMENTS

| | | |
|---|---|---|
| 2019/0003889 A1 | 1/2019 | Kasahara et al. |
| 2019/0003890 A1 | 1/2019 | Kasahara et al. |

FOREIGN PATENT DOCUMENTS

| | | |
|---|---|---|
| JP | 2015-228641 A | 12/2015 |
| JP | 2017-083314 A | 5/2017 |
| JP | 2017-147585 A | 8/2017 |
| JP | 2019-113494 A | 7/2019 |

OTHER PUBLICATIONS

Ito et al., JP 2015178995A, "Tone Calibration Device, Imaging Device and Tone Inspection Device", Date Published: Oct. 8, 2015 (Year: 2015).*

* cited by examiner

CALIBRATION DEVICE, CALIBRATION METHOD, CALIBRATION PROGRAM, SPECTROSCOPIC CAMERA, AND INFORMATION PROCESSING DEVICE

The present application is based on, and claims priority from JP Application Serial Number 2020-108967, filed Jun. 24, 2020, the disclosure of which is hereby incorporated by reference herein in its entirety.

BACKGROUND

1. Technical Field

The present disclosure relates to a calibration device, a calibration method, a calibration program, a spectroscopic camera, and an information processing device.

2. Related Art

According to the related art, a calibration device that calculates a transformation matrix for transforming a measured value measured by a camera into a predetermined color coordinate value and thus calibrates the camera is known, for example, as disclosed in JP-A-2015-178995.

The device disclosed in JP-A-2015-178995 switches an LED as a light source to sequentially output a plurality of kinds of color light, measures an RGB value obtained from a two-dimensional sensor with respect to each color and an XYZ value from a spectroscopic device, and calculates a transformation matrix for transformation between an RGB value and an XYZ value.

However, the calibration device and the calibration method disclosed in JP-A-2015-178995 have a problem in that, while a measured value measured by the camera can be accurately transformed into a tristimulus value when the light source used to calculate a transformation matrix is used, the accuracy of transformation into a tristimulus value drops when the light source is changed.

In JP-A-2015-178995, a transformation matrix for transforming a measured value into a tristimulus value is calculated. However, a similar problem occurs when calculating a transformation matrix for transforming a measured value into a parameter in another color measurement system or for correcting a measured value to a proper measured value. When the light source is changed, a transformation error of the measured value increases and the accuracy of transformation drops.

SUMMARY

A calibration device according to an aspect of the present disclosure includes one or more processors. The one or more processors acquire a measured value obtained when a spectroscopic light source configured to output uniform light with a predetermined spectroscopic wavelength and configured to change the spectroscopic wavelength outputs the uniform light while changing the spectroscopic wavelength of the uniform light and a spectroscopic measurement unit to be calibrated spectroscopically measures the outputted uniform light. The one or more processors acquire a target value for each of the spectroscopic wavelengths obtained when the spectroscopic measurement unit measures the uniform light. The one or more processors calculate a transformation matrix for transforming the measured value, based on the measured value and the target value.

In the calibration device, the spectroscopic measurement unit may be a spectroscopic camera picking up a spectroscopic image corresponding to a plurality of wavelengths. The one or more processors may acquire a gradation value of a predetermined pixel in the spectroscopic image, as the measured value.

In the calibration device, the one or more processors may divide the gradation value of the spectroscopic image by an exposure time employed when the spectroscopic camera measures the uniform light, and thus correct exposure.

According to another aspect of the present disclosure, a calibration method for calculating a transformation matrix for transforming a measured value measured by a spectroscopic measurement unit is provided. The method causes one or more processors to: acquire a measured value obtained when a spectroscopic light source configured to output uniform light with a predetermined spectroscopic wavelength and configured to change the spectroscopic wavelength outputs the uniform light while changing the spectroscopic wavelength of the uniform light and a spectroscopic measurement unit to be calibrated spectroscopically measures the outputted uniform light; acquire a target value for each of the spectroscopic wavelengths obtained when the spectroscopic measurement unit measures the uniform light; and calculate a transformation matrix for transforming the measured value, based on the measured value and the target value.

A non-transitory computer-readable storage medium according to still another aspect of the present disclosure stores a program. The program causes one or more processors to: acquire a measured value obtained when a spectroscopic light source configured to output uniform light with a predetermined spectroscopic wavelength and configured to change the spectroscopic wavelength outputs the uniform light while changing the spectroscopic wavelength of the uniform light and a spectroscopic measurement unit to be calibrated spectroscopically measures the outputted uniform light; acquire a target value for each of the spectroscopic wavelengths obtained when the spectroscopic measurement unit measures the uniform light; and calculate a transformation matrix for transforming the measured value, based on the measured value and the target value.

A spectroscopic camera according to still another aspect of the present disclosure includes: a memory in which the transformation matrix calculated by the foregoing calibration device is recorded; and the one or more processors configured to correct a color at a predetermined position in the spectroscopic image, using the transformation matrix.

An information processing device according to still another aspect of the present disclosure includes: a memory in which the transformation matrix calculated by the foregoing calibration device is recorded; an interface receiving data representing the spectroscopic image picked up by the spectroscopic camera; and the one or more processors configured to correct a color at a predetermined position in the spectroscopic image, using the transformation matrix.

DESCRIPTION OF EXEMPLARY EMBODIMENTS

An embodiment of the present disclosure will now be described.

Figure 1:
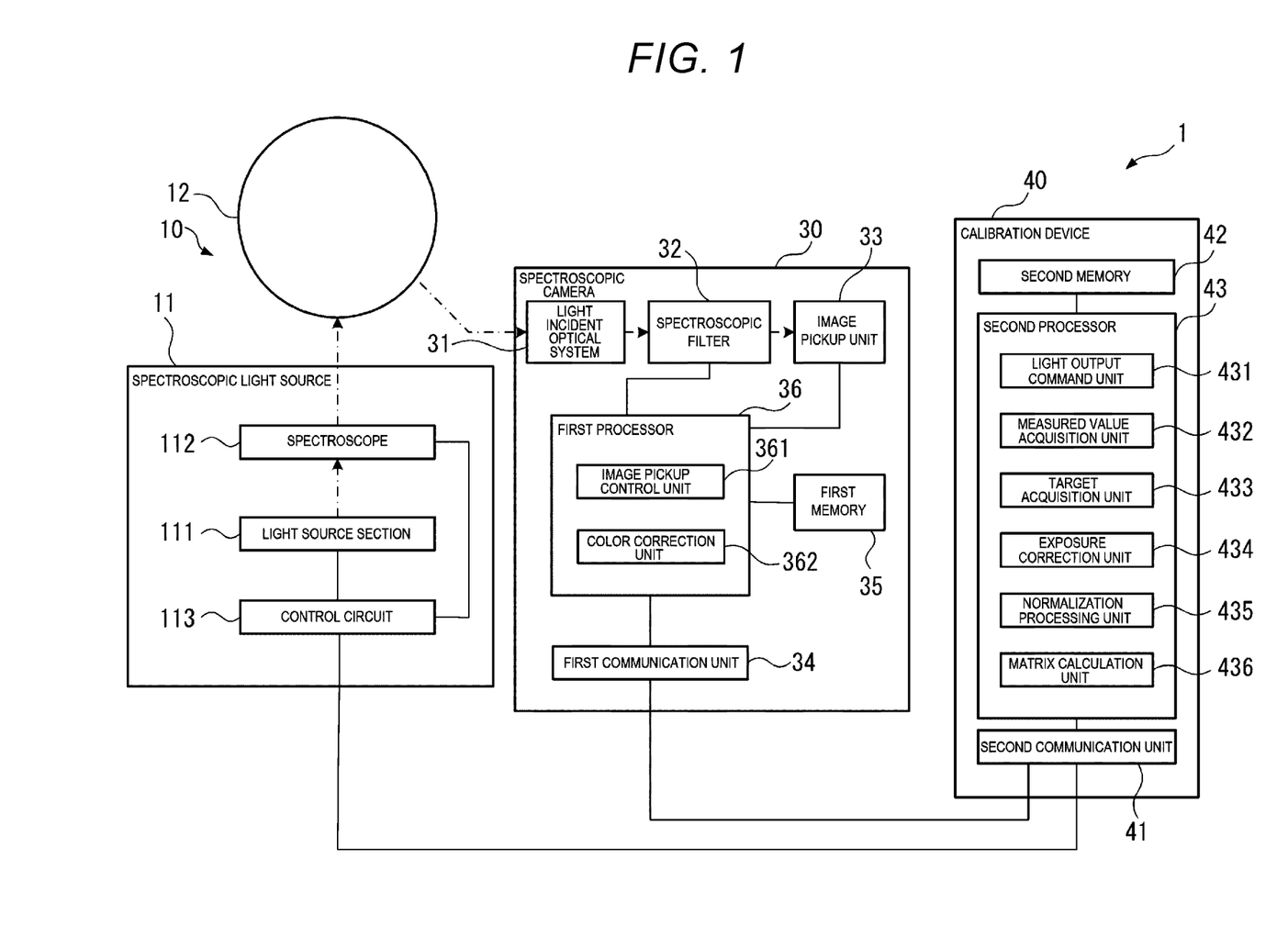
FIG. 1 is a block diagram showing a calibration system according to an embodiment of the present disclosure.

FIG. 1 is a block diagram showing a schematic configuration of a calibration system 1 according to this embodiment.

As shown in FIG. 1, the calibration system 1 has a light source unit 10, a spectroscopic camera 30 to be calibrated, and a calibration device 40.

Configuration of Light Source Unit 10

The light source unit 10 has a spectroscopic light source 11 and an integrating sphere 12.

The spectroscopic light source 11 is a light source outputting light with a predetermined spectroscopic wavelength and can change the spectroscopic wavelength to a plurality of wavelengths.

For example, the spectroscopic light source 11 has a light source section 111, a spectroscope 112, and a control circuit 113, as shown in FIG. 1.

The light source section 111 is a light source outputting light having a substantially uniform light intensity over a wavelength range of a spectroscopic image that can be picked up by the spectroscopic camera 30. The light source section 111 is formed, for example, of a white light source such as a halogen lamp.

The spectroscope 112 transmits light with a predetermined spectroscopic wavelength, of the light outputted from the light source section 111. For example, a monochromator or the like can be used as the spectroscope 112. The spectroscope 112 can change the wavelength of exiting light with a high resolution. For example, in this embodiment, the spectroscope 112 outputs light, sequentially changing the wavelength of the light every 5 nm within a range from 380 nm to 730 nm, that is, to 71 wavelengths.

The control circuit 113 is a circuit controlling the light source section 111 and the spectroscope 112. The control circuit 113 adjusts the emission intensity of the light outputted from the light source section 111 and changes the spectroscopic wavelength of the light transmitted through the spectroscope 112.

The integrating sphere 12 is an optical member having a spherical reflection surface at its interior and has an entrance port and an exit port, not illustrated. The spectroscopic light source 11 is coupled to the entrance port. The light outputted from the spectroscopic light source 11 enters the entrance port. The spectroscopic camera 30 is coupled to the exit port.

The integrating sphere 12 reflects light with a predetermined spectroscopic wavelength entering from the spectroscopic light source 11, on the reflection surface, and thus mixes the light to generate uniform light having a uniform amount of light within the plane. A part of this uniform light exits from the exit port to the spectroscopic camera 30.

Configuration of Spectroscopic Camera 30

The spectroscopic camera 30 is a spectroscopic measurement unit to be calibrated in the calibration system 1. The spectroscopic camera 30 receives image light outputted from the integrating sphere 12 and picks up a spectroscopic image corresponding to a plurality of wavelengths.

The spectroscopic camera 30 has a light incident optical system 31, a spectroscopic filter 32, an image pickup unit 33, a first communication unit 34, a first memory 35, and a first processor 36, as shown in FIG. 1.

The light incident optical system 31 has a plurality of lenses which image light enters. The light incident optical system 31 guides the entering image light to the spectroscopic filter 32 and the image pickup unit 33.

Figure 2:
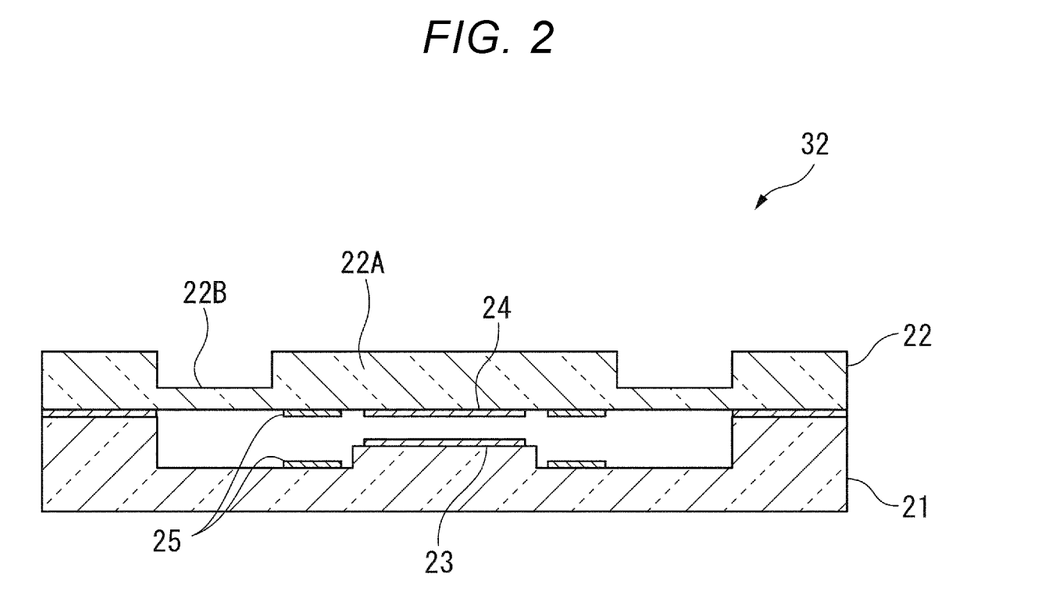
FIG. 2 shows an example of a spectroscopic filter in the embodiment.

FIG. 2 is a schematic cross-sectional view showing an example of the spectroscopic filter 32.

The spectroscopic filter 32 is a variable-wavelength Fabry-Perot element that transmits light with a predetermined wavelength of the entering image light. The spectroscopic filter 32 has a first substrate 21, a second substrate 22, a first reflection film 23 provided at the first substrate 21, a second reflection film 24 provided at the second substrate 22, and a gap changing part 25, as shown in FIG. 2.

In this spectroscopic filter 32, the first reflection film 23 and the second reflection film 24 face each other via a gap. The second substrate 22 has a moving part 22A where the second reflection film 24 is provided, and a holding part 22B holding the moving part 22A and allowing the moving part 22A to move toward and away from the first substrate 21. The gap changing part 25 is formed, for example, of an electrostatic actuator. The gap changing part 25 displaces the moving part 22A toward the first substrate 21 and thus changes the dimension of the gap between the first reflection film 23 and the second reflection film 24. Thus, the wavelength of the light transmitted through the spectroscopic filter 32 changes according to the dimension of the gap.

The image pickup unit 33 has a plurality of image pickup pixels. The image pickup unit 33 receives the light transmitted through the spectroscopic filter 32 and picks up a spectroscopic image.

The first communication unit 34 is a communication device communicating with an external device such as the calibration device 40 and includes a network adapter. The communication method of the first communication unit 34 is not particularly limited and may be wired-connected communication or wirelessly connected communication.

The first memory 35 is a recording unit storing various kinds of information that controls the spectroscopic camera 30, and is formed of a general storage device such as a hard disk or a semiconductor memory. In the first memory 35, a transformation matrix generated by the calibration device 40 and a drive table to drive the spectroscopic filter 32, or the like, are recorded. In the first memory 35, various programs for controlling the spectroscopic camera 30 are recorded as well. The transformation matrix will be described in detail later.

The first processor 36 reads and executes a program stored in the first memory 35 and thus functions as an image pickup control unit 361 and a color correction unit 362.

The image pickup control unit 361 controls the spectroscopic filter 32, based on the drive table, and thus changes the wavelength of the light transmitted through the spectroscopic filter 32. The image pickup control unit 361 also controls exposure in the image pickup unit 33 and causes the image pickup unit 33 to pick up a spectroscopic image.

The color correction unit 362 corrects a color at a predetermined position in the spectroscopic image, using the transformation matrix.

Configuration of Calibration Device 40

The calibration device 40 includes a second communication unit 41, a second memory 42, and a second processor 43 or the like, as shown in FIG. 1.

The second communication unit 41 is a communication device similar to the above. The second communication unit 41 is coupled to the spectroscopic light source 11 and the spectroscopic camera 30 and communicates with the spectroscopic light source 11 and the spectroscopic camera 30.

The second memory 42 stores various programs for controlling the calibration device 40.

The second processor 43 reads and executes a program recorded in the second memory 42 and thus functions as a light output command unit 431, a measured value acquisition unit 432, a target acquisition unit 433, an exposure correction unit 434, a normalization processing unit 435, and a matrix calculation unit 436.

The light output command unit 431 commands the spectroscopic light source 11 to output light with a predetermined spectroscopic wavelength that is set in advance. For example, the light output command unit 431 outputs, to the spectroscopic light source 11, a command to sequentially output light with 71 wavelengths, that is, every 5 nm over a range from 380 nm to 730 nm.

The measured value acquisition unit 432 transmits, to the spectroscopic camera 30, a spectroscopic measurement command that commands the spectroscopic camera 30 to pick up a spectroscopic image, and then receives a spectroscopic image from the spectroscopic camera 30.

The spectroscopic camera 30 sequentially changes the transmission wavelength of the spectroscopic filter 32 and picks up a spectroscopic image that is a picked-up image corresponding each wavelength. At this time, the spectroscopic camera 30 acquires spectroscopic images corresponding to a plurality of wavelengths, based on uniform light with one wavelength outputted from the light source unit 10. That is, the spectroscopic camera 30 picks up spectroscopic images corresponding to a plurality of wavelengths every time the wavelength of the light emitted from the spectroscopic light source 11 is changed. For example, in this embodiment, the spectroscopic light source 11 is commanded to sequentially output light with 71 wavelengths as described above, and for each wavelength, spectroscopic images corresponding to 16 wavelengths are acquired. In this case, 71×16 spectroscopic images are acquired.

In this embodiment, spectroscopic images corresponding to a plurality of wavelengths are picked up, based on one uniform light. Therefore, an optical spectrum of each pixel can be found based on a gradation value of each pixel in each spectroscopic image. The gradation value of each pixel in the spectroscopic image and the optical spectrum found based on the gradation value are equivalent to the measured value according to the present disclosure.

The target acquisition unit 433 acquires a target value of each pixel in the spectroscopic image corresponding to each wavelength acquired when the spectroscopic camera 30 picks up the image of uniform light. The target value is an ideal value of the gradation value of each pixel in the spectroscopic image corresponding to each wavelength acquired when the spectroscopic camera 30 picks up the image, that is, an ideal value of the optical spectrum.

The target value may be, for example, stored in the second memory 42 in advance, or may be stored in the first memory 35 of the spectroscopic camera 30 and acquired from the spectroscopic camera 30.

The exposure correction unit 434 divides the gradation value of each pixel in the spectroscopic image by an exposure time employed when the image pickup unit 33 of the spectroscopic camera 30 picks up an image of the image light, and thus corrects the gradation value.

In this embodiment, the spectroscopic camera 30 measures the exposure time employed when the image pickup unit 33 picks up an image of the image light, and outputs the exposure time in association with a spectroscopic image to the calibration device 40. The exposure correction unit 434 corrects the gradation value of each pixel in the spectroscopic image, based on the exposure time received along with the spectroscopic image by the measured value acquisition unit 432.

The normalization processing unit 435 normalizes a measured value and a spectroscopic reference value corresponding to a correction point, using a luminance value of the image light outputted from the spectroscopic light source 11.

The matrix calculation unit 436 calculates a transformation matrix for transforming the measured value, using the measured value and the spectroscopic reference value that are normalized. In this embodiment, the measured value and the target value represent the gradation value and the optical spectrum of each pixel acquired when the image of uniform light with a predetermined wavelength is picked up. The matrix calculation unit 436 calculates a transformation matrix for correcting the measured value to a value corresponding to an ideal spectroscopic characteristic.

Calibration Method

The calibration system 1 according to this embodiment performs color correction of the spectroscopic camera 30 to be calibrated.

Figure 3:
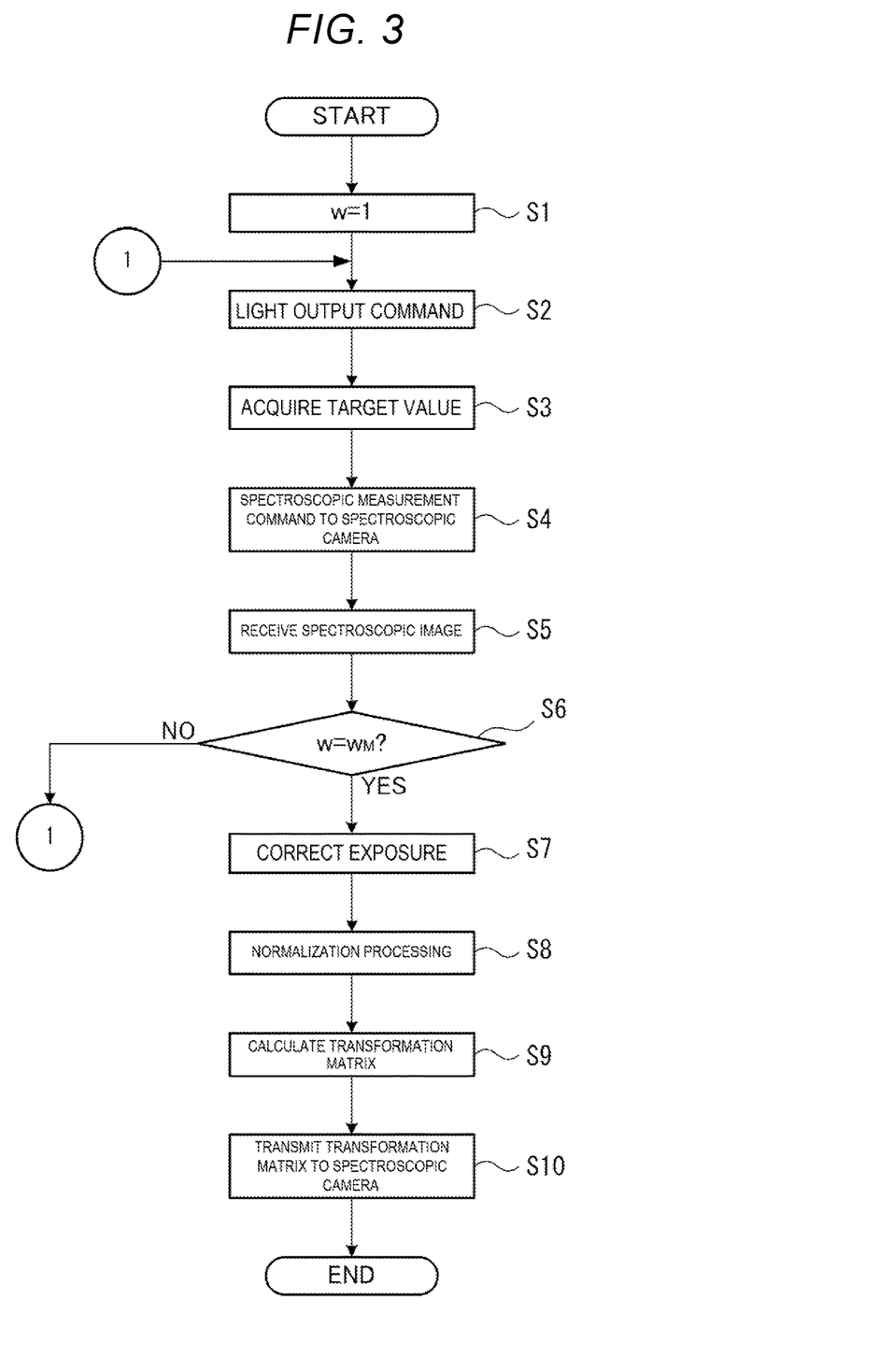
FIG. 3 is a flowchart showing a calibration method for a calibration device in the embodiment.

FIG. 3 is a flowchart showing a calibration method according to this embodiment.

In calibration processing for the spectroscopic camera 30, that is, processing to generate a transformation matrix, first, the spectroscopic light source 11 and the spectroscopic camera 30 are coupled to the integrating sphere 12, and the calibration device 40 is commanded to start calibration processing.

Thus, the calibration device 40 first initializes a wavelength variable w representing the wavelength of light outputted from the spectroscopic light source 11 and sets w=1 (step S1). A wavelength A corresponding to the wavelength variable w is set in advance. For example, in the case of picking up a spectroscopic image corresponding to a wavelength of every 5 nm over a visible light range from 380 nm to 730 nm from the spectroscopic light source 11, a wavelength $\lambda_1$ corresponding to w=1 is 380 nm and a wavelength $\lambda_2$ corresponding to w=2 is 385 nm. In this way, every time the wavelength variable w is increased by 1, the wavelength $\lambda_w$ is increased by 5 nm each. In this case, a maximum value $w_M$ of the wavelength variable w is $w_M$=71 and the corresponding wavelength $\lambda_w$ is $\lambda_w$=730.

The light output command unit 431 transmits an output command to emit light corresponding to the wavelength variable w, to the spectroscopic light source 11 (step S2). Step S2 causes the spectroscopic light source 11 to output light with the wavelength $\lambda_w$ corresponding to the wavelength variable w. Thus, uniform light with the wavelength $\lambda_w$ is inputted from the integrating sphere 12 to the spectroscopic camera 30.

The target acquisition unit 433 of the calibration device 40 acquires a target value corresponding to the wavelength $\lambda_w$ from the second memory 42 (step S3). That is, a measured value that is considered ideal at each pixel in a spectroscopic image corresponding to each wavelength acquired when the spectroscopic camera 30 picks up an image of the light with the wavelength $\lambda_w$ is read. Here, an example where step S3 is executed after step S2, is given. However, step S3 can be executed at any timing between step S1 and step S6.

The measured value acquisition unit 432 of the calibration device 40 outputs a spectroscopic measurement command to the spectroscopic camera 30 (step S4).

Thus, the spectroscopic camera 30 picks up an image of the uniform light emitted from the integrating sphere 12 and thus acquires a spectroscopic image. Specifically, the image pickup control unit 361 changes the wavelength of the light transmitted through the spectroscopic filter 32 to a plurality of wavelengths and thus acquires spectroscopic images corresponding to the respective wavelengths.

A spectroscopic image corresponding to a wavelength $\lambda_a$ based on the image light with the wavelength variable w is defined as $D_0(x, y, w, \lambda_a)$. Here, (x, y) represents a pixel position in the spectroscopic image. Also, a is an image wavelength variable corresponding to the wavelength of the spectroscopic image, and its maximum value is $a_{max}$. For example, in the case of picking up a spectroscopic image in 16 bands every 20 nm over a range from 400 nm to 700 nm, $a_{max}=16$, $\lambda_1=400$ nm, and $\lambda_{16}=700$ nm. Therefore, 71×16 spectroscopic images $D_0(x, y, 1, \lambda_1)$ to $D_0(x, y, 71, \lambda_{16})$ are acquired.

At this time, the spectroscopic camera 30 measures an exposure time $t(w, \lambda_a)$ of the uniform light to the image pickup unit 33 employed when picking up the spectroscopic image corresponding to each wavelength, and transmits the exposure time $t(w, \lambda_a)$ in association with the picked-up spectroscopic image to the calibration device 40.

On receiving the spectroscopic image $D_0(x, y, w, \lambda_a)$ from the spectroscopic camera 30 (step S5: measured value acquisition step), the measured value acquisition unit 432 of the calibration device 40 stores the spectroscopic image $D_0(x, y, w, \lambda_a)$ in the second memory 42. The gradation value of each pixel in the spectroscopic image $D_0(x, y, w, \lambda_a)$ is the measured value according to the present disclosure.

Next, the light output command unit 431 determines whether the wavelength variable w is the maximum value $w_M$ or not (step S6). If No in step S6, 1 is added to the wavelength variable w and the processing returns to step S2. That is, the wavelength of the light outputted from the spectroscopic light source 11 is changed and the processing of steps S3 to S5 is repeated.

If Yes in step S6, a matrix calculation step based on steps S7 to S10 is executed. Specifically, the exposure correction unit 434 divides the spectroscopic image $D_0(x, y, w, \lambda_a)$ by the exposure time $t(w, \lambda_a)$ to correct exposure, and thus acquires a corrected spectroscopic image $D(x, y, w, \lambda_a)$ (step S7), as expressed by the formula (1) given below. Thus, a change in the amount of light due to the difference in the exposure time employed when picking up the image of each uniform light with each wavelength is corrected.

$$D(x, y, w, \lambda_a) = \frac{D_0(x, y, w, \lambda_a)}{t(w, \lambda_a)} \quad (1)$$

In the description below, a measured value $s_w$ and a target value $x_w$ are defined as follows. That is, the measured value $s_w$ is the gradation value at each pixel in the spectroscopic image corresponding to the wavelengths $\lambda_1$ to $\lambda_{amax}$ picked up based on the uniform light with the wavelength variable w. The target value $x_w$ is its ideal value. In this embodiment, the spectroscopic camera 30 picks up spectroscopic images corresponding to a plurality of wavelengths based on uniform light with one spectroscopic wavelength. Therefore, an optical spectrum showing the relationship between the wavelength A and the measured value $s_w$ at each pixel is acquired.

$$s_w = \begin{pmatrix} s(w, \lambda_1) \\ \vdots \\ s(w, \lambda_{a\,max}) \end{pmatrix}$$

$$x_w = \begin{pmatrix} x(w, \lambda_1) \\ \vdots \\ x(w, \lambda_{a\,max}) \end{pmatrix}$$

Next, the normalization processing unit 435 divides the measured value $s_w$ and the target value $x_w$ by a luminance value $L_w$ of the uniform light acquired when the light source unit 10 outputs the uniform light corresponding to the wavelength variable w, and thus normalizes the measured value $s_w$ and the target value $x_w$ (step S8). Specifically, the normalization processing unit 435 executes normalization processing as expressed by the following formulae (2) and (3).

$$A = \left( \frac{s_1}{L_1}, \ldots \frac{s_{w_M}}{L_{w_M}} \right) \quad (2)$$

$$B = \left( \frac{x_1}{L_1}, \ldots \frac{x_{w_M}}{L_{w_M}} \right) \quad (3)$$

That is, the normalization processing unit 435 divides the measured value $s_w$ of each pixel in the spectroscopic images corresponding the plurality of wavelengths ($\lambda_1$ to $\lambda_{amax}$) based on the uniform light with the wavelength variable w, by the luminance value $L_w$ of the uniform light, and thus finds a normalized measured value A. The normalization processing unit 435 also divides the acquired target value $x_w$ by the luminance value $L_w$ of the uniform light and thus finds a normalized target value B.

Thus, the normalized measured value A and the normalized target value B form a matrix of $a_{max} \times w_M$. For example, when $w_M=71$ and $a_{max}=16$ as described above, a matrix of 16×71 is formed. The normalized measured value A and the normalized target value B are calculated by the number of correction points. After the above processing, the matrix calculation unit 436 calculates a transformation matrix M(x, y) for correct (transforming) the measured value (step S9), based on the following formula (4).

$$M(x,y)=\{AA'-\beta1)^{-1}AB'\}'$$

$$\text{or } M(x,y)=BA'(AA'-\beta1)^{-1} \quad (4)$$

In the formula (4), 13, is a normalization coefficient to prevent overfitting. I is an identity matrix of $a_{max} \times a_{max}$. The superscript "'" represents a transposed matrix. The superscript "−1" represents an inverse matrix.

Subsequently, the matrix calculation unit 436 transmits the calculated transformation matrix M(x, y) to the spectroscopic camera 30 (step S10). Thus, the spectroscopic camera 30 stores the received transformation matrix M(x, y) in the first memory 35.

Image Correction Processing

Image correction of a spectroscopic image by the spectroscopic camera 30 where the transformation matrix M(x, y) as described above is set will now be described.

The spectroscopic camera 30 in this embodiment acquires the transformation matrix M(x, y) and subsequently stores the transformation matrix M(x, y) in the first memory 35, as described above. When picking up a spectroscopic image of an image pickup target object, the spectroscopic camera 30 corrects the spectroscopic image, using the transformation matrix M(x, y).

Specifically, when an instruction to pickup an image of a spectroscopic image with a predetermined wavelength of the target object is given by the user, the image pickup control unit 361 of the spectroscopic camera 30 changes the wavelength of the light transmitted through the spectroscopic filter 32 to the wavelength designated by the instruction, and executes image pickup of a spectroscopic image. When a plurality of wavelengths are designated by the instruction, the image pickup control unit 361 sequentially picks up spectroscopic images corresponding to these wavelengths.

The image pickup control unit 361 also divides the gradation value of each pixel in the spectroscopic image corresponding to each wavelength by the exposure time employed when picking up the spectroscopic image corresponding to the wavelength, and thus corrects the gradation value.

Subsequently, the color correction unit 362 of the spectroscopic camera 30 corrects the gradation value $S(x, y)$ of each pixel in the spectroscopic image by the transformation matrix $M(x, y)$, that is, transforms the gradation value $S(x, y)$ into a proper gradation value, as expressed by the following formula (5).

$$X(x,y)=M(x,y) \times S(x,y) \qquad (5)$$

Advantageous Effects of this Embodiment

The calibration device 40 in this embodiment has the second processor 43 functioning as the measured value acquisition unit 432, the target acquisition unit 433, and the matrix calculation unit 436. The measured value acquisition unit 432 acquires a spectroscopic image including a measured value obtained when the spectroscopic camera 30 to be calibrated spectroscopically measures uniform light from the light source unit 10. The target acquisition unit 433 acquires a target value $x_w$, which is an ideal measured value corresponding to each spectroscopic wavelength obtained when the spectroscopic camera 30 measures the uniform light. The matrix calculation unit 436 calculates a transformation matrix $M(x, y)$ for transforming a measured value $s_w$ into a predetermined parameter, based on the measured value $s_w$ and the target value $x_w$.

Therefore, in this embodiment, a transformation matrix that transforms the optical spectrum of each pixel in a spectroscopic image obtained when the spectroscopic camera 30 measures uniform light with a predetermined spectroscopic wavelength into an ideal optical spectrum corresponding to the uniform light, is calculated, and the spectroscopic characteristic of the spectroscopic camera 30 can be set to an ideal value. Thus, a proper spectroscopic image can be picked up, regardless of the light source used for image pickup of the spectroscopic image.

In this embodiment, the spectroscopic camera 30 picking up spectroscopic images corresponding to a plurality of wavelengths is used as a spectroscopic measurement unit, and the measured value acquisition unit 432 acquires the gradation value of each pixel in the spectroscopic images as a measured value.

Thus, a transformation matrix for transforming a measured value into a target value can be calculated for each pixel in the spectroscopic image. That is, even when the photoelectric conversion characteristic differs from one pixel to another in the spectroscopic image, a transformation matrix can be calculated for each pixel so that an ideal spectroscopic characteristic is achieved. The spectroscopic camera 30 can pick up a spectroscopic image with high accuracy.

In this embodiment, the second processor 43 functions as the exposure correction unit 434 dividing the gradation value of the spectroscopic image by the exposure time $t(w, \lambda)$ employed when the spectroscopic camera 30 measures the uniform light. Therefore, a noise component of the gradation value due to the difference in the exposure time can be eliminated.

MODIFICATION EXAMPLES

The present disclosure is not limited to the foregoing embodiment and includes any configuration formed by a modification, an improvement or a suitable combination of various embodiments or the like within a range that can achieve the object of the present disclosure.

Modification Example 1

In the embodiment, the transformation matrix $M(x, y)$ for each pixel in the spectroscopic image is calculated. However, a transformation matrix $M(x_i, y_j)$ only for a predetermined correction point $(x_i, y_j)$ in the spectroscopic image may be calculated.

In this case, when the spectroscopic camera 30 executes correction processing on the spectroscopic image, the transformation matrix $M(x, y)$ for each pixel may be found by interpolation based on the transformation matrix $M(x_i, y_j)$ for the correction point $(x_i, y_j)$.

Modification Example 2

In the embodiment, the gradation value of each pixel in a spectroscopic image based on uniform light with a predetermined wavelength is employed as a measured value, and the measured value is handled as an optical spectrum expressed by a determinant such as the formula (2). Thus, the transformation matrix $M(x, y)$ based on the formula (4) is calculated. That is, in the embodiment, a transformation matrix for correcting the measured value in such a way that the optical spectrum of the measured value becomes an ideal optical spectrum, in other words, that the spectroscopic characteristic of the spectroscopic camera 30 becomes an ideal spectroscopic characteristic, is calculated.

Meanwhile, the matrix calculation unit 436 may employ the optical spectrum of each pixel in a spectroscopic image based on uniform light with a predetermined wavelength, as a measured value, and calculate a transformation matrix for transforming the optical spectrum into a chromaticity in another color coordinate system. In this case, a target chromaticity in the color coordinate system may be used as a target value. For example, a tristimulus value or an RGB value may be used as the target value. Also, the target value may be transformed into any parameter that is different from the optical spectrum.

Modification Example 3

In the embodiment, a transformation matrix is calculated based on the least square method, using the formula (4). However, this is not limiting. The matrix calculation unit 436 may calculate a transformation matrix, for example, using principal component regression or partial least square regression.

Modification Example 4

An example where the light source unit 10 causes image light to enter the integrating sphere 12 from the spectroscopic light source 11 so as to generate uniform light is described. However, this is not limiting. For example, a light source may cast light onto a diffuse reflection plate, which diffusely reflects the light, and the spectroscopic camera 30 may measure the light reflected by the diffuse reflection plate.

Modification Example 5

In the embodiment, the Fabry-Perot element as shown in FIG. 2 is employed as an example of the spectroscopic filter 32. However, this is not limiting. As the spectroscopic filter 32, various spectroscopic elements such as AOTF and LCTF can be used.

Modification Example 6

In the embodiment, a configuration where the light source unit 10 outputs uniform light with a predetermined wavelength by having the spectroscopic light source 11 causing the spectroscope 112 to spectrally split light from the light source section 111 is employed. However, this is not limiting. For example, the spectroscopic light source 11 may have a plurality of types of light source sections emitting light with different wavelengths from each other, and the light source section to be turned on may be changed from one light source section to another, thus outputting light with a predetermined wavelength.

Modification Example 7

In the embodiment, the calibration device 40 has the exposure correction unit 434. However, the image pickup control unit 361 of the spectroscopic camera 30 may be configured to perform exposure correction for the gradation value of a picked-up spectroscopic image and output the corrected gradation value to the calibration device 40. In this case, the exposure correction unit 434 of the calibration device 40 can be omitted.

When the image pickup unit 33 of the spectroscopic camera 30 does not change the exposure time according to the amount of light that is received, the exposure correction need not be performed.

Modification Example 8

In the embodiment, the spectroscopic camera 30 is employed as an example of the spectroscopic measurement unit. However, a spectroscopic measurement unit that performs spectroscopic measurement processing on a predetermined measuring point may be employed.

Modification Example 9

In the embodiment, the spectroscopic camera 30 and the calibration device 40 are configured as separate devices. Instead of such a configuration, the spectroscopic camera 30 and the calibration device 40 may be included in a single information processing device. An example of such an information processing device is a smartphone or a tablet computer. This information processing device has the spectroscopic camera 30, the calibration device 40, and a display device, not illustrated. In this case, for example, the second processor 43 in the calibration device 40 is configured to execute a predetermined computer-readable program stored in the second memory 42, thus perform object determination processing based on an output from the spectroscopic camera 30, and display the result of the processing at the display device.

Modification Example 10

In the embodiment, the first processor 36 in the spectroscopic camera 30 has the function of the color correction unit 362. Instead of such a configuration, in another embodiment, the color correction unit 362 may be present in another information processing device, not illustrated, that is not the spectroscopic camera 30. In this case, this information processing device may have a memory, a processor, and a communication device. The processor of this information processing device may be configured or programmed to execute the following processing. First, the processor receives data representing the transformation matrix M(x, y) from the calibration device 40 via the communication device and stores the data in the memory. The processor also receives data representing the gradation value S(x, y) of each pixel in the spectroscopic image from the spectroscopic camera 30 and stores the data in the memory. The processor then derives a gradation value X (x, y), based on the transformation matrix M(x, y) and the gradation value S(x, y) that are stored. The processor also stores data representing the derived gradation value X(x, y) in the memory and/or outputs the data via the communication device so that the data is used by the spectroscopic camera 30 or another information processing device.

Overview of Present Disclosure

The calibration device according to an aspect of the present disclosure includes: a measured vale acquisition unit that acquires a measured value obtained when a spectroscopic light source configured to output uniform light with a predetermined spectroscopic wavelength and configured to change the spectroscopic wavelength outputs the uniform light while changing the spectroscopic wavelength of the uniform light and a spectroscopic measurement unit to be calibrated spectroscopically measures the outputted uniform light; a target acquisition unit that acquires a target value for each of the spectroscopic wavelengths obtained when the spectroscopic measurement unit measures the uniform light; and a matrix calculation unit that calculates a transformation matrix for transforming the measured value, based on the measured value and the target value.

Thus, the calibration device can calculate a transformation matrix such that a measured value obtained when the spectroscopic measurement unit measures uniform light with a predetermined spectroscopic wavelength becomes an ideal target value based on the uniform light. Therefore, highly accurate spectroscopic measurement can be performed regardless of the light source used for the spectroscopic measurement.

In the calibration device according to the first aspect, the spectroscopic measurement unit is a spectroscopic camera picking up a spectroscopic image corresponding to a plurality of wavelengths. The measured value acquisition unit acquires a gradation value of a predetermined pixel in the spectroscopic image, as the measured value.

Thus, a transformation matrix for transforming a measured value into a target value can be calculated for each pixel in the spectroscopic image. That is, even when the photoelectric conversion characteristic differs from one pixel to another in the spectroscopic image, a transformation matrix can be calculated for each pixel so that an ideal spectroscopic characteristic is achieved. The spectroscopic camera can pick up a spectroscopic image with high accuracy.

The calibration device according to the first aspect has an exposure correction unit that divides the gradation value of the spectroscopic image by an exposure time employed when the spectroscopic camera measures the uniform light, and thus corrects exposure.

Thus, a noise component of the gradation value of the spectroscopic image due to the difference in the exposure time can be eliminated.

A calibration method according to a second aspect of the present disclosure is for calculating a transformation matrix for transforming a measured value measured by a spectroscopic measurement unit. The method includes: a measured value acquisition step of acquiring a measured value obtained when a spectroscopic light source configured to output uniform light with a predetermined spectroscopic wavelength and configured to change the spectroscopic wavelength outputs the uniform light while changing the spectroscopic wavelength of the uniform light and a spectroscopic measurement unit to be calibrated spectroscopically measures the outputted uniform light; a target acquisition step of acquiring a target value for each of the spectroscopic wavelengths obtained when the spectroscopic measurement unit measures the uniform light; and a matrix calculation step of calculating a transformation matrix for transforming the measured value, based on the measured value and the target value.

Thus, as in the first aspect, a transformation matrix that enables the spectroscopic measurement unit to perform highly accurate spectroscopic measurement regardless of the light source used for the spectroscopic measurement can be calculated.

A calibration program according to a third aspect of the present disclosure is readable and executable by a computer and causes the computer to perform the calibration method according to the second aspect.

Thus, the calibration method according to the second aspect can be performed by the computer, and as in the first aspect, a transformation matrix that enables the spectroscopic measurement unit to perform highly accurate spectroscopic measurement regardless of the light source used for the spectroscopic measurement can be calculated.

A spectroscopic camera according to a fourth aspect of the present disclosure includes: a recording unit in which the transformation matrix calculated by the calibration device according to the first aspect is recorded; and a color correction unit that corrects a color at a predetermined position in the spectroscopic image, using the transformation matrix.

Thus, the spectroscopic camera can pick up a highly accurate spectroscopic image regardless of the external light (light source) at the time of picking up the spectroscopic image.

An information processing device according to a fifth aspect of the present disclosure includes: a recording unit in which the transformation matrix calculated by the calibration device according to the first aspect is recorded; a communication unit that receives data representing the spectroscopic image picked up by the spectroscopic camera; and a color correction unit that corrects a color at a predetermined position in the spectroscopic image, using the transformation matrix.

Thus, the information processing device can perform highly accurate color correction of the spectroscopic image picked up by the spectroscopic camera regardless of the external light (light source) present when the spectroscopic camera picks up the spectroscopic image.

What is claimed is:

1. A calibration device comprising one or more processors configured to:
acquire a measured value obtained when a spectroscopic light source configured to output uniform light with a predetermined spectroscopic wavelength and configured to change the spectroscopic wavelength outputs the uniform light while changing the spectroscopic wavelength of the uniform light and a spectroscopic measurement unit to be calibrated spectroscopically measures the outputted uniform light;
acquire a target value for each of the spectroscopic wavelengths obtained when the spectroscopic measurement unit measures the uniform light;
calculate a transformation matrix for transforming the measured value, based on the measured value and the target value; and
correct a spectroscopic image by the spectroscopic light source based on the transformation matrix, wherein:
the spectroscopic measurement unit is a spectroscopic camera picking up a spectroscopic image corresponding to a plurality of wavelengths, and
the one or more processors are further configured to acquire a gradation value of a predetermined pixel in the spectroscopic image, as the measured value.

2. The calibration device according to claim 1, wherein the one or more processors are further configured to divide the gradation value of the spectroscopic image by an exposure time employed when the spectroscopic camera measures the uniform light, and thus correct exposure.

3. A spectroscopic camera comprising:
a memory in which the transformation matrix calculated by the calibration device according to claim 2 is recorded; and
the one or more processors configured to correct a color at a predetermined position in the spectroscopic image, using the transformation matrix.

4. An information processing device comprising:
a memory in which the transformation matrix calculated by the calibration device according to claim 2 is recorded;
an interface receiving data representing the spectroscopic image picked up by the spectroscopic camera; and
the one or more processors configured to correct a color at a predetermined position in the spectroscopic image, using the transformation matrix.

5. A spectroscopic camera comprising:
a memory in which the transformation matrix calculated by the calibration device according to claim 1 is recorded; and
the one or more processors configured to correct a color at a predetermined position in the spectroscopic image, using the transformation matrix.

6. An information processing device comprising:
a memory in which the transformation matrix calculated by the calibration device according to claim 1 is recorded;
an interface receiving data representing the spectroscopic image picked up by the spectroscopic camera; and
the one or more processors configured to correct a color at a predetermined position in the spectroscopic image, using the transformation matrix.

7. A calibration method for calculating a transformation matrix for transforming a measured value measured by a spectroscopic measurement unit, the method causing one or more processors to:
acquire a measured value obtained when a spectroscopic light source configured to output uniform light with a predetermined spectroscopic wavelength and configured to change the spectroscopic wavelength outputs the uniform light while changing the spectroscopic wavelength of the uniform light and a spectroscopic measurement unit to be calibrated spectroscopically measures the outputted uniform light;

acquire a target value for each of the spectroscopic wavelengths obtained when the spectroscopic measurement unit measures the uniform light;

calculate a transformation matrix for transforming the measured value, based on the measured value and the target value; and correcting a spectroscopic image by the spectroscopic light source based on the transformation matrix, wherein:

the spectroscopic measurement unit is a spectroscopic camera picking up a spectroscopic image corresponding to a plurality of wavelengths, and the one or more processors are further configured to acquire a gradation value of a predetermined pixel in the spectroscopic image, as the measured value.

8. A non-transitory computer-readable storage medium storing a program, the program causing one or more processors to:

acquire a measured value obtained when a spectroscopic light source configured to output uniform light with a predetermined spectroscopic wavelength and configured to change the spectroscopic wavelength outputs the uniform light while changing the spectroscopic wavelength of the uniform light and a spectroscopic measurement unit to be calibrated spectroscopically measures the outputted uniform light;

acquire a target value for each of the spectroscopic wavelengths obtained when the spectroscopic measurement unit measures the uniform light;

calculate a transformation matrix for transforming the measured value, based on the measured value and the target value; and correct a spectroscopic image by the spectroscopic light source based on the transformation matrix, wherein:

the spectroscopic measurement unit is a spectroscopic camera picking up a spectroscopic image corresponding to a plurality of wavelengths, and the one or more processors are further configured to acquire a gradation value of a predetermined pixel in the spectroscopic image, as the measured value.

* * * * *